United States Patent
Wirtz

Patent Number: 5,746,296
Date of Patent: May 5, 1998

[54] TORQUE CONVERTER HAVING LOCK-UP CLUTCH

[75] Inventor: Hans-Peter Wirtz, Cologne, Germany

[73] Assignee: Ford Global Technologies, Inc., Dearborn, Mich.

[21] Appl. No.: 710,442

[22] Filed: Sep. 17, 1996

[30] Foreign Application Priority Data

Feb. 17, 1996 [DE] Germany .................. 196 05 921.6

[51] Int. Cl.$^6$ ............................. F16H 45/02; F16D 13/66
[52] U.S. Cl. ................. 192/3.29; 192/3.28; 192/66.2; 192/107 R; 192/112
[58] Field of Search .................. 192/3.27, 3.21, 192/3.28, 3.29, 66.21, 66.2, 70.15, 87.16, 107 R, 112

[56] References Cited

U.S. PATENT DOCUMENTS

| | | | |
|---|---|---|---|
| 883,732 | 4/1908 | Moore | 192/70.15 |
| 2,045,615 | 6/1936 | Rosle et al. | 192/3.29 |
| 2,130,895 | 9/1938 | Ness | 192/3.28 X |
| 2,619,848 | 12/1952 | Carnagua | 192/3.3 X |
| 3,463,033 | 8/1969 | Fisher | |
| 3,485,328 | 12/1969 | Bilton | 192/3.3 |
| 3,839,864 | 10/1974 | Ahlen | 192/3.27 |
| 4,580,668 | 4/1986 | Pickard et al. | 192/3.3 X |
| 4,593,801 | 6/1986 | Takeuchi et al. | 192/107 R X |
| 4,784,019 | 11/1988 | Morscheck | 192/3.27 |

FOREIGN PATENT DOCUMENTS

3236621 C1  2/1984  Germany.

*Primary Examiner*—Rodney H. Bonck
*Attorney, Agent, or Firm*—Frank G. McKenzie

[57] ABSTRACT

In a torque converter with a cone-type lock-up clutch having a clutch disc (14) with a conical friction disc area (24) cooperating directly with the conical inner wall of the torque converter housing (1), the inner wall of the torque converter housing (1) has in its jacket part (2) at least two conical areas (K1 and K2) disposed concentrically of one another, the radially inner conical area (K1) having a relatively small angle and the radially outer conical area (K2) having a relatively large angle, and cooperates, with clutch discs (14 and 14') having different radial extents and having friction disc areas (23 and 23') with different cone angles.

3 Claims, 1 Drawing Sheet

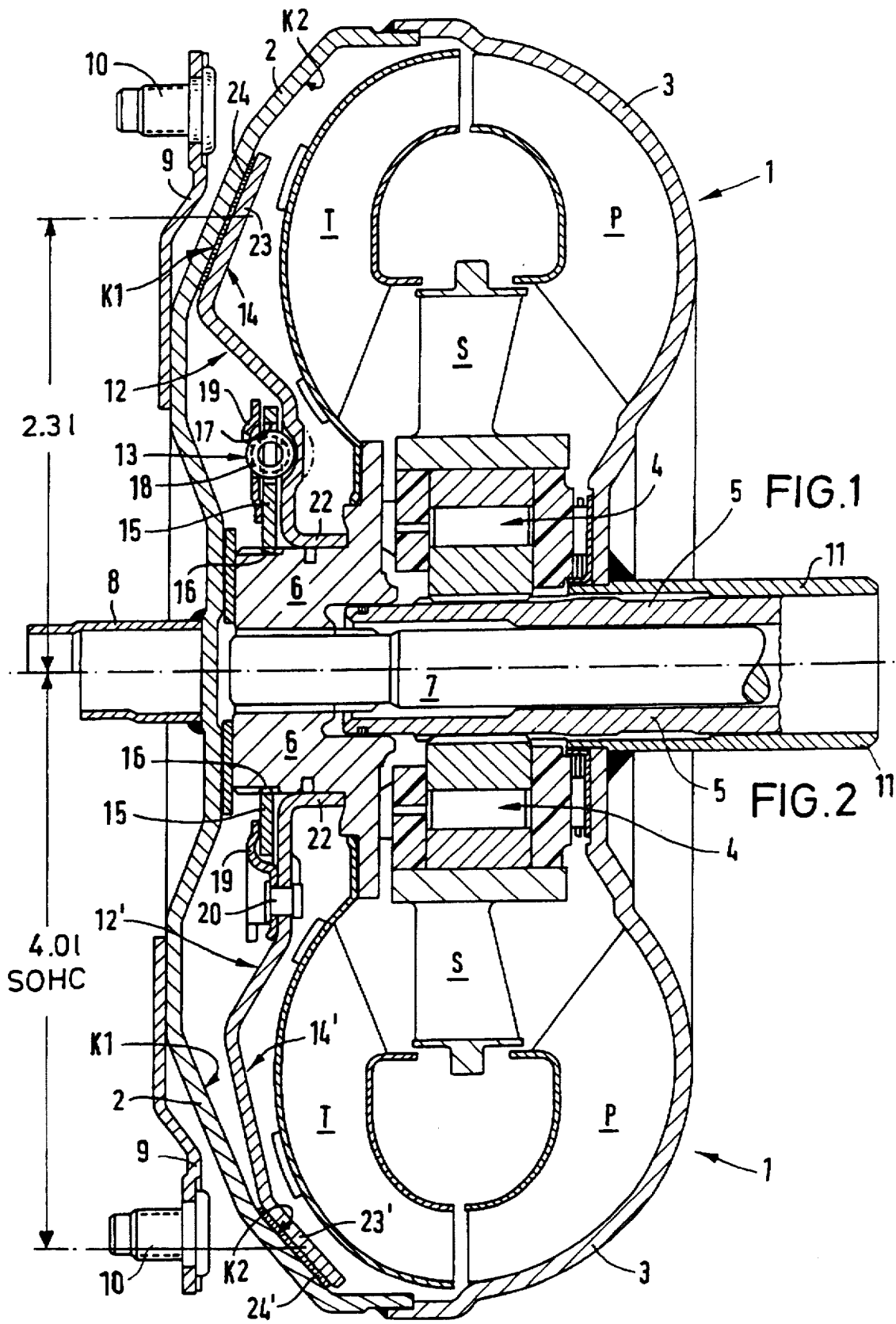

TORQUE CONVERTER HAVING LOCK-UP CLUTCH

BACKGROUND OF THE INVENTION

1. Field of the Invention

The invent ion relates to the field of torque converters for automotive transmissions.

2. Discussion of the Prior Art

From U.S. Pat. No. 3,463,033, and in particular from FIG. 4 thereof, a torque converter with a cone-type lock-up clutch is known in which an expensive double clutch arrangement is shown.

A torque converter with a cone-type lock-up clutch is also known from German Specification 32 36 621, in this case with a simpler single clutch arrangement. Such torque converters with cone-type lock-up clutches have thus been familiar to those skilled in the art for more than 20 years, and are used when the self-amplifying effect obtained with a cone clutch, used as a lock-up clutch, is engaged.

SUMMARY OF THE INVENTION

The present invention proceeds from such known cone-type lock-up clutches and has as its object to provide means by which the self-amplification obtainable with a cone-type lock-up clutch can be adapted in a simple manner to the torque capacity of a torque converter provided for a given application.

To this end, the invention provides a torque converter of the kind referred to in which the inner wall of the jacket part of the housing has at least two conical areas disposed mutually concentrically, the radially inner conical area having a relatively small angle and the radially outer conical area having a relatively large angle, and cooperates as a module in the manner of an assembly kit with clutch discs having different radial extents and having disc areas with different cone angles. In this way, a series of torque converters having cone-type lock-up clutches and designed for different torque transfer capacities can be provided with the use of only a single torque converter housing. The clutch discs provided for the series can have the same form in their hub and damper regions and differ only in their radially outer, conical friction disc areas.

BRIEF DESCRIPTION OF THE DRAWINGS

The invention will now be described in more detail, by way of example; with reference to two embodiments shown in the accompanying drawings, in which:

FIG. 1 shows the upper half of a torque converter having a cone-type lock-up clutch, in accordance with the invention, and FIG. 2 shows the lower half of a torque converter having a cone-type lock-up clutch, in accordance with the invention, wherein a radially larger clutch disc with a higher torque capacity is provided.

DETAILED DESCRIPTION OF PREFERRED EMBODIMENTS

In the two figures, FIG. 1 and FIG. 2, corresponding parts are given the same reference symbols. In a torque converter 1 housing, which consists in known manner of a drive shell or jacket housing 2 and an impeller housing 3 connected thereto, an impeller P with a plurality of blades, a guide or stator S, and a turbine T are arranged in a toroidal flow circuit. The guide or stator S is carried in known manner on a fixed hollow haft 5 via a free-wheel 4.

The turbine T is drivingly connected via a turbine hub 6 to a turbine shaft 7, which forms an input member, e.g., for an automatic transmission of a motor vehicle, comprising a plurality of planet gear sets. torque converter housing 1 is centered by means of its jacket part 2, for example, via a centering sleeve 8, on a flywheel of an internal combustion engine (not shown), from which a driving connection is made via studs 10 to a drive plate 9, which affords a certain range of axial and radial flexibility The other side of the torque converter housing 1, which comprises the impeller part 3, is carried in known manner in a bearing section (not shown) of the transmission housing, via an output shaft 11, with the hollow driving shaft at the same time forming the driving connection to a lubricant pump required, for an automatic transmission.

In order to eliminate the slippage losses that occur in a hydrokinetic torque converter even after the coupling point has been reached, it has been known for many years to provide so-called lock-up clutches, which establish a direct driving connection, parallel to the turbine T, between the torque converter housing 1 and the turbine hub 6. Such a lock-up clutch is labeled 12 in FIG. 1, and 12' in FIG. 2. Such a lock-up clutch 12 or 12' consists essentially of a damping assembly 13 and a clutch plate or disc 14 or 14'.

The damping assembly 13 consists essentially of a base plate 15, which is driveably connected to the turbine hub 6 via a splined connection 16. In the base plate 15, there are a plurality of window openings 17 in which tangentially disposed coil springs 18 are fitted so as to cooperate alternately with the base plate 15 and with the clutch disc 14 or 14'. The springs 18 are prevented from falling out by means of a cover plate 19, which is driveably connected to the clutch disc 14 or 14'by pins 20 (shown in FIG. 2). The inner region of the clutch discs 14 and 14' consists of a projecting sleeve 22 or 22', which is rotatably supported on the clutch hub. The radially outer region of the clutch discs 14, 14' is provided with a facing 24, of suitable friction lining material in the angled friction disc areas 23, 23'.

According to the invention, the drive dish or jacket part 2 is provided with at least two conical surfaces K1 and K2, disposed mutually concentrically, the radially inner cone surface K1 having a relatively small cone angle with respect to the radial axis and the radially outer conical surface K2 having a relatively large cone angle, so that these surfaces K1, K2 can cooperate with clutch discs having different radial extents and different cone angles.

The dimensions identified by heavy arrows and the names 2.3L and 4.0L SOHC, respectively, show that, with the use of the same torque converter housing and the use of different clutch discs, one with a relatively small and one with a relatively large radial extent, and one with a relatively small cone angle and one with a relatively large cone angle, various torque converters can be created in which cone-type lock-up clutches can be adapted to the respective torque transfer requirements of different internal combustion engines in a very simple manner.

The damping system used here in the region of the clutch discs is, of course, only shown by way of example, and a wide variety of appropriate embodiments of such damping devices are possible without departing from the essentials of the present invention.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

I claim:

1. A torque converter having an impeller and turbine arranged in mutual hydrokinetic fluid flow relation about a common axis, comprising:

a housing having at least two conical areas disposed radially about the axis, and located on an inner wall of the housing, a first radially inner conical area having a relatively small angle with respect to a radial axis, a second radially outer conical area having a relatively larger angle with respect to a radial axis; and a lockup clutch including a conical clutch disc having a friction disc area, adapted to alternately driveably engage and release one of the group consisting of the first and second conical areas, said first and second conical areas extending from the axis mutually different radial distances.

2. The torque converter of claim 1, wherein the clutch disc is supported on the turbine for rotation relative thereto and driveably connected to the turbine through a damper assembly having a surface thereof fixed against rotation relative to the turbine.

3. The torque converter of claim 1, further comprising a first friction lining fixed to a surface of the friction disc that faces a conical area.

* * * * *